United States Patent [19]
Beck

[11] Patent Number: 5,934,863
[45] Date of Patent: Aug. 10, 1999

[54] VEHICLE LOADING AND UNLOADING APPARATUS AND METHOD

[76] Inventor: Gregory S. Beck, 8230 E. Alpine Ct., Orange County, Calif. 92808

[21] Appl. No.: 08/824,677

[22] Filed: Mar. 26, 1997

[51] Int. Cl.⁶ .................................................. B65G 67/02
[52] U.S. Cl. ...................... 414/538; 144/344; 280/414.1; 414/813
[58] Field of Search ...................... 414/537, 538, 414/522, 462, 786, 343, 345, 477, 478, 480, 909, 813; 280/414.1; 114/344

[56] References Cited

U.S. PATENT DOCUMENTS

| | | | |
|---|---|---|---|
| 2,370,427 | 2/1945 | Sherry | 414/537 |
| 2,720,327 | 10/1955 | Bain | 414/909 X |
| 3,263,845 | 8/1966 | Davidson | 414/538 X |
| 3,486,786 | 12/1969 | Howarth | 114/344 X |
| 3,734,322 | 5/1973 | Vaillancourt | 414/538 X |
| 3,971,484 | 7/1976 | Anderson et al. | 414/538 X |
| 4,063,659 | 12/1977 | Welch | 414/537 X |
| 4,081,095 | 3/1978 | Wilburn et al. | 414/522 X |
| 4,212,580 | 7/1980 | Fluck | 414/538 X |
| 4,239,438 | 12/1980 | Everson | 414/538 X |
| 4,801,152 | 1/1989 | Elliott et al. | 114/344 X |
| 4,960,356 | 10/1990 | Wrenn | 414/537 |
| 5,005,846 | 4/1991 | Taylor | 114/344 X |
| 5,064,335 | 11/1991 | Bergeron et al. | 414/522 |
| 5,249,910 | 10/1993 | Ball | 414/538 |
| 5,542,810 | 8/1996 | Florus | 414/538 |
| 5,556,249 | 9/1996 | Heine | 414/538 X |
| 5,603,600 | 2/1997 | Egan et al. | 414/538 X |
| 5,618,150 | 4/1997 | Poindexter | 414/522 X |
| 5,730,577 | 3/1998 | Jones | 414/538 X |

FOREIGN PATENT DOCUMENTS

| | | | |
|---|---|---|---|
| 1127451 | 8/1956 | France | 414/538 |

OTHER PUBLICATIONS

Advertisement: "Splash" Magazine; Jun. 1996: Jet Trax.
Advertisement: "Personal Watercraft Illustrated": Aug. 1997, p. 60 E–Z Tote, Ent.
Literature: "Splash" Magazine; Apr. 1997; p. 66—Beaver Tail Manufacturing & E–Z Load Ramp.
Brochure at Trade Show; Toy Rak—Spring 1997; 2 pages.
Advertisement: Jet Sports—Jun.; p. 17; Jet Trax, The Ultimate Personal Watercraft/ATV/Snowmobile Transport System.
Advertisement May 1997 Jet Sports, Jet Trax, The Ultimate Personal Watercraft Storage System.

*Primary Examiner*—David A. Bucci
*Attorney, Agent, or Firm*—John J. Connors; Connors & Assoc.

[57] ABSTRACT

A personal vehicle loading and unloading apparatus includes a support structure mounted to a platform such as a truck bed which supports the personal vehicle, and a moveable ramp mounted telescopically within the support structure. The ramp is manually moveable between a retracted position where substantially the entire ramp is within the truck bed and an extended position where substantially the entire ramp extends from the truck bed. The ramp and the support structure each have an upper surface over which the bottom surface of the personal vehicle, or a conveyor for the vehicle, rides as the personal vehicle is moved to and from the truck bed. These upper surfaces each comprise an anti-friction material having a kinetic friction coefficient no greater than 0.5. A winch mechanism mounted to the support structure pulls the personal vehicle into the truck bed during loading and lowers slowly the personal vehicle from the truck bed during unloading.

21 Claims, 13 Drawing Sheets

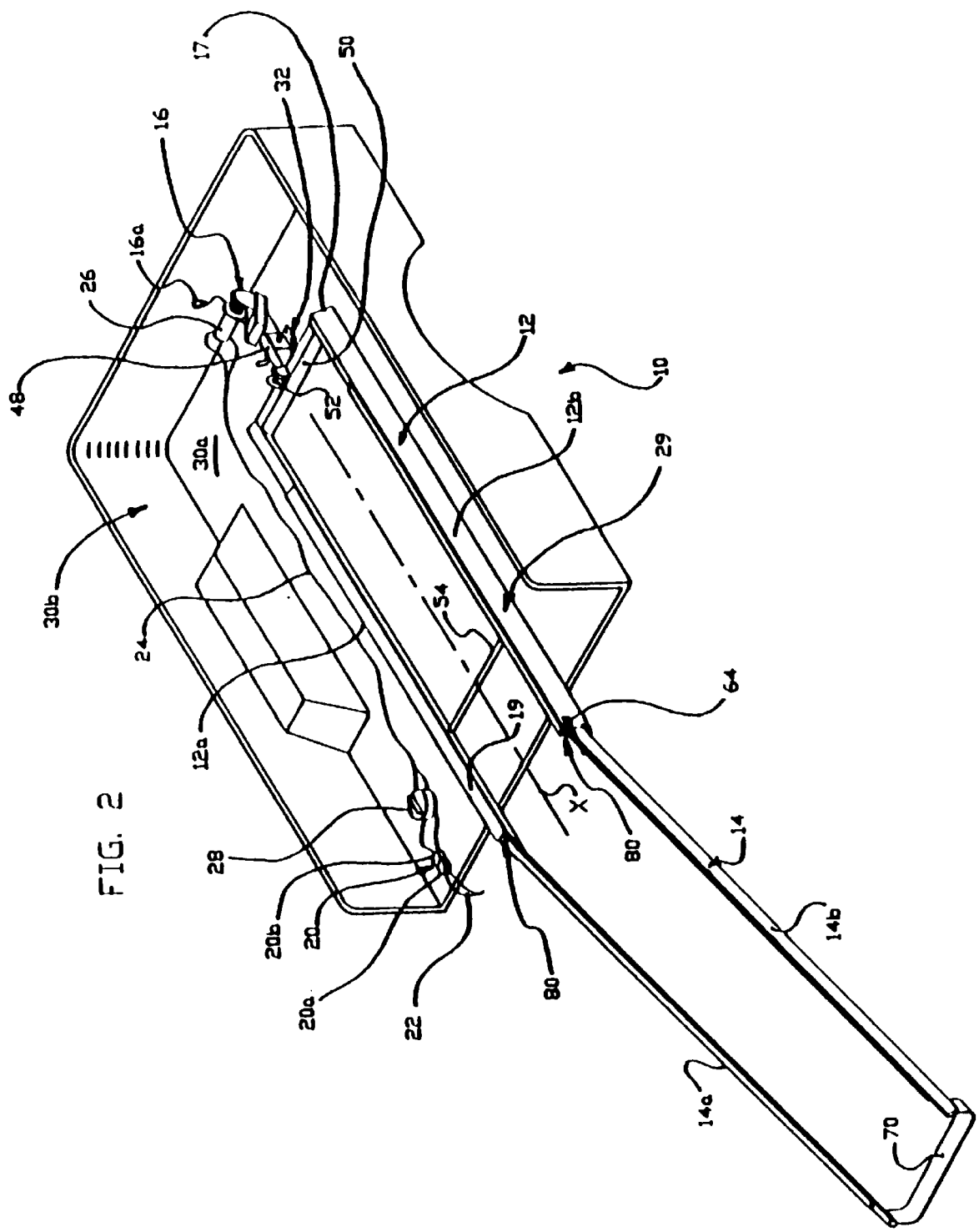

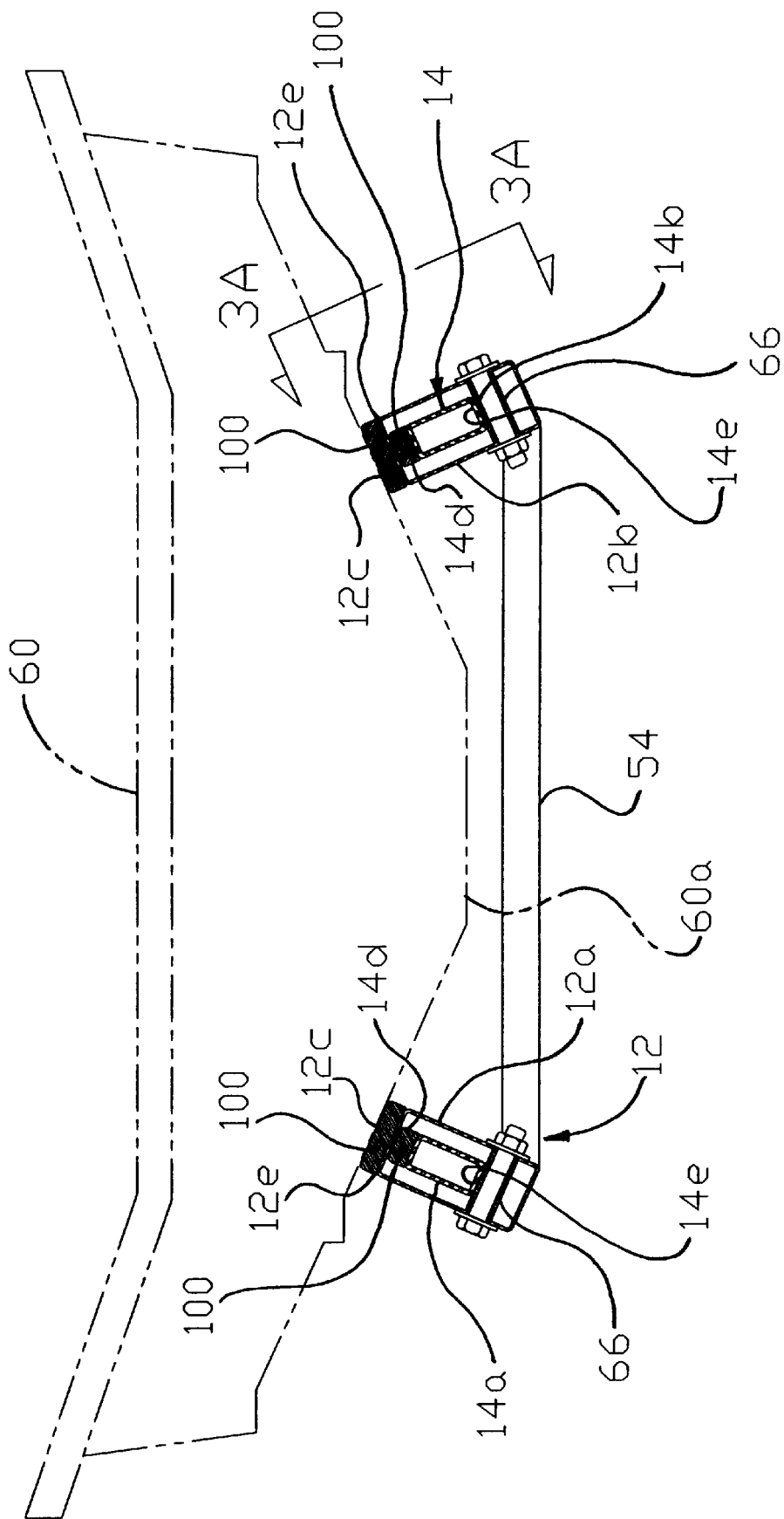

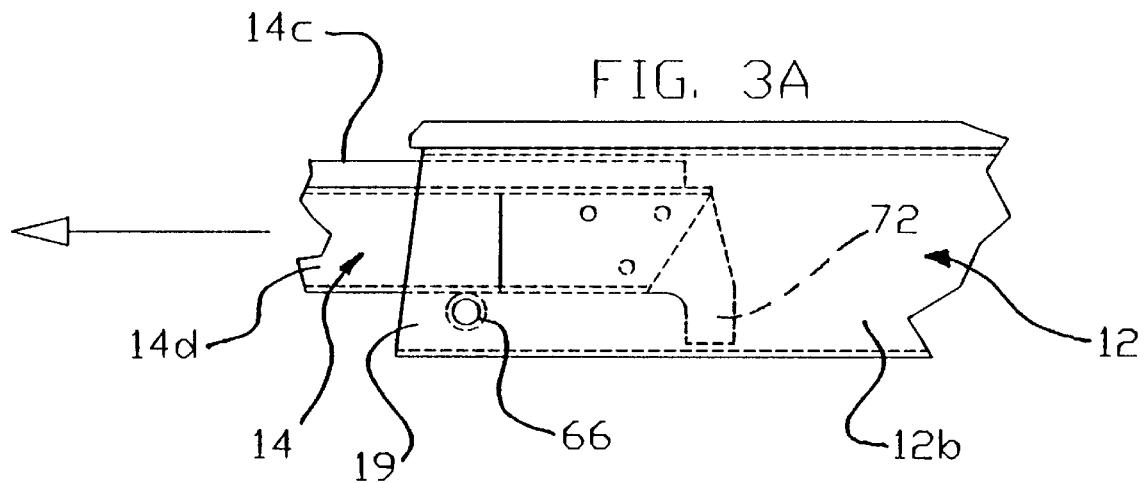
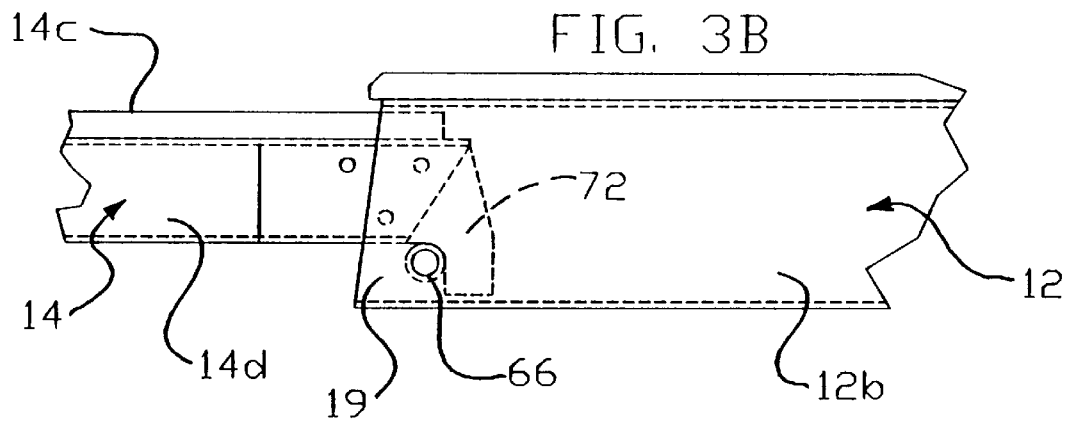
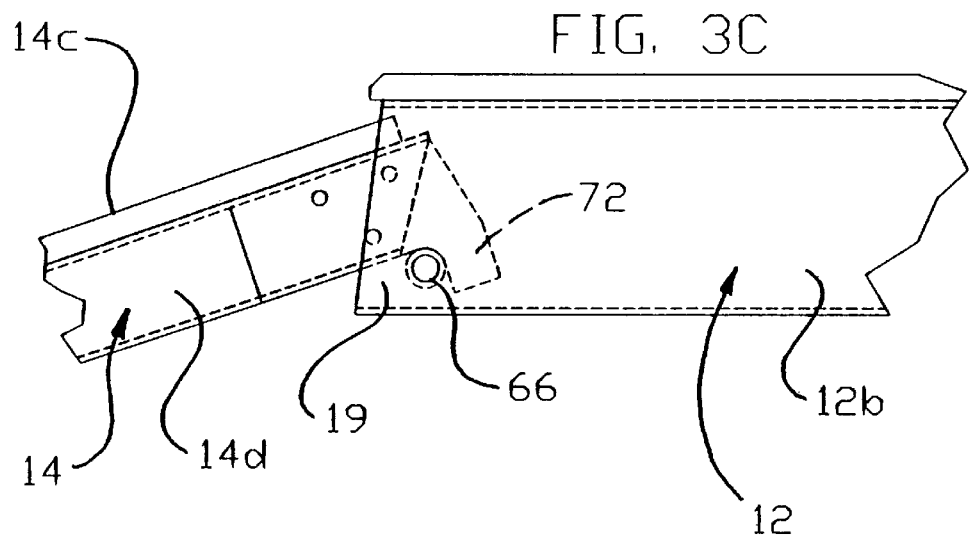

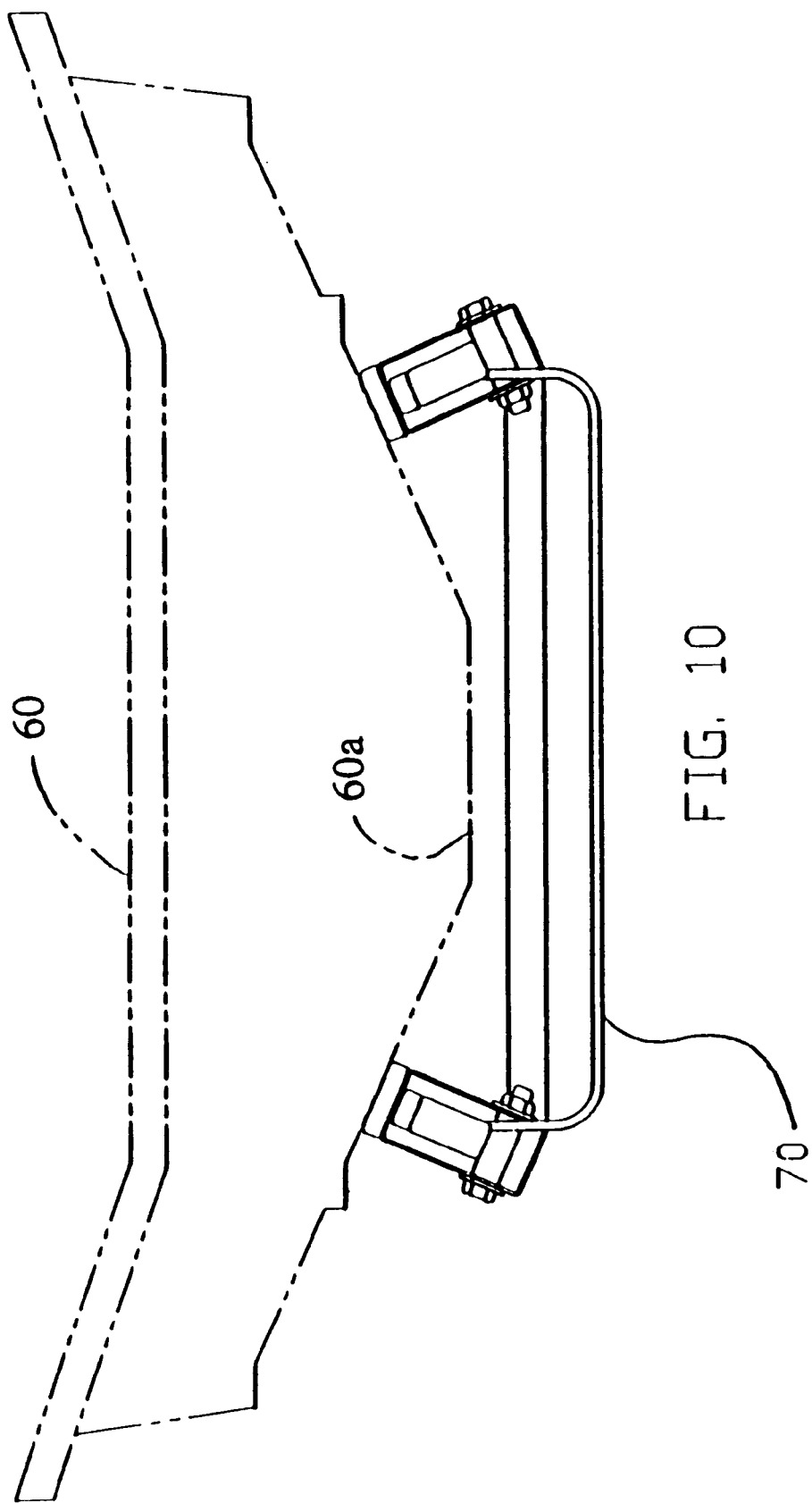

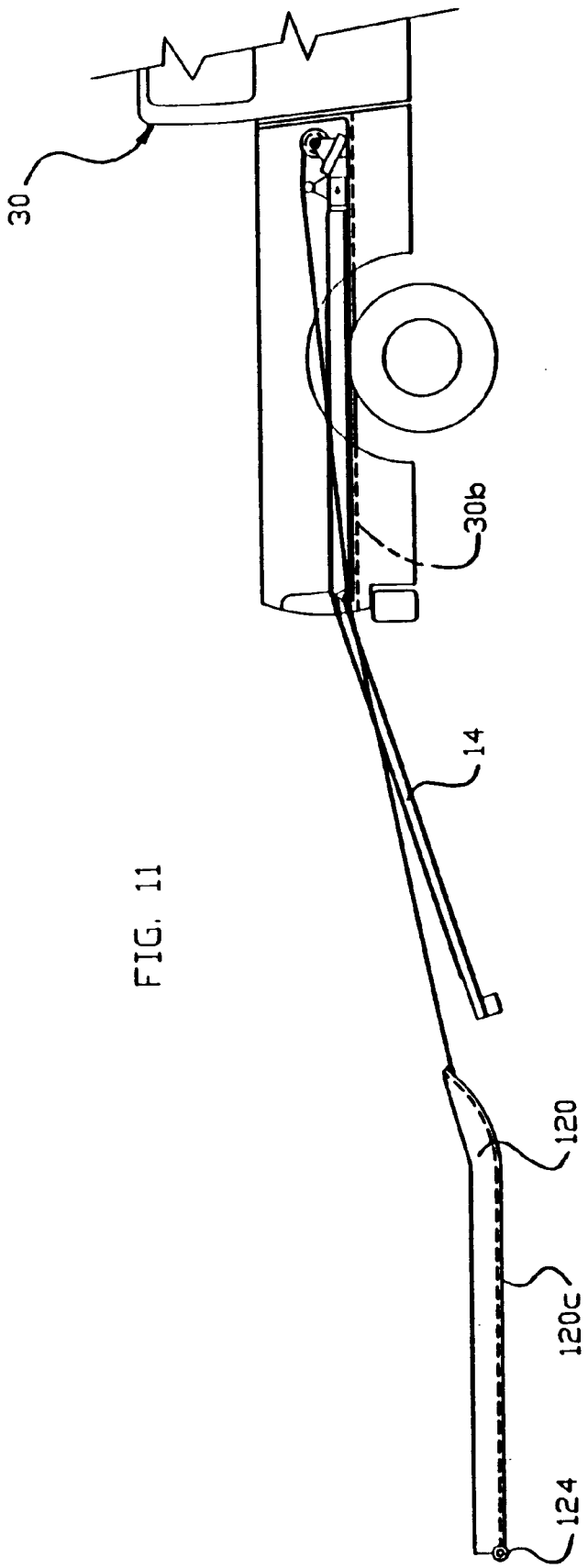

VEHICLE LOADING AND UNLOADING APPARATUS AND METHOD

RELATED DISCLOSURE DOCUMENT

This application is based on the Disclosure Document No. 402,086 filed Jul. 24, 1996, and entitled "System and Method for Loading a Personal Watercraft Into a Pickup Truck." This Disclosure Document is incorporated herein by reference and made a part of this application.

BACKGROUND OF THE INVENTION

1. Field of the Invention

This invention relates to a personal vehicle loading and unloading apparatus and method. Using the apparatus and method of this invention, personal vehicles such as a personal watercraft such as, for example, a Jet Ski®, a motorcycle, an ATV, a snowmobile, etc. are easily loaded and unloaded to a platform, such as a dock, the bed of a pick-up truck, trailer, or other transport

2. Background Discussion

Personal watercraft, which are small water vehicles that typically carry one to three people, are very popular. These watercraft are sometimes carried to lakes, rivers, and oceans using pick-up trucks. A number of devices have been suggested for facilitating loading and unloading the watercraft into the bed of the pick-up truck, but these have suffered from disadvantages such as (1) being difficult or inconvenient to mount onto the bed of the pick-up trucks, (2) damaging or injuring the exposed surfaces of the personal watercraft; (3) when loaded on the truck, carrying the watercraft a substantial distance above the floor of the bed to elevate the center of gravity of the combination of the truck and watercraft, making it more easy for the truck to tip over; and (4) being complex, and thus expensive, employing many moving parts and sometimes hydraulic equipment. In addition to personal watercraft, other personal vehicles such as motorcycles, ATV's, snowmobiles, etc. are often transported to the location where they are to be used or need to be unloaded and unloaded from a raised platform. It would be advantageous to provide an apparatus that was adapted to load and unload all these different types of personal vehicles.

SUMMARY OF THE INVENTION

It is the objective of this invention to provide a loading and unloading apparatus for personal vehicles which is a substantial improvement over known devices.

This invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENTS," one will understand how the features of this invention provide its benefits, which include convenience in attaching and detaching the apparatus to the bed of a pick-up truck, dock, or other platform, improved safety because of the lower center of gravity, avoidance of damage of the personal vehicle during loading and unloading, ease of storage, and low-cost manufacture.

The first feature of the personal vehicle loading and unloading apparatus of this invention is that it is detachably mounted to a platform such as, for example, the floor of a truck bed to support the personal vehicle on the platform. It is mounted to be moved to different positions on the platform to accommodate personal vehicles of varying lengths. The height of the apparatus is typically less than about 12 inches measured from the surface of the platform. Thus, when used with a pick-up truck, for example, the center of gravity of the combination of the truck and personal vehicle will be as close to ground level as possible.

The second feature is that the apparatus includes a ramp which is manually moveable between a retracted position where substantially the entire ramp is on the platform and an extended position where substantially the entire ramp extends from the platform except for an end of the ramp which is supported directly by the platform or indirectly by a support structure for the ramp. The ramp includes an upper surface, which in accordance with this invention, comprises an anti-friction material having a kinetic friction coefficient no greater than about 0.5. (The kinetic friction coefficient of the an anti-friction material is no greater than 0.5 when measured in contact with mild steel.) When a personal watercraft is being loaded or unloaded, the bottom surface of the personal watercraft rides over this upper surface as the personal watercraft is moved to and from the platform. When, for example, a motor cycle is being loaded and unloaded, a vehicle conveyor is used to hold the motor cycle and the conveyor has a bottom surface that rides over this upper surface of the ramp.

The third feature is a support structure mounted to the platform which supports the personal vehicle retained on the platform. The support structure has a length about equal to the length of the platform, and may extend slightly beyond the end of the platform, for example it may extend from the open end of the bed of a pick-up truck from about 12 to about 24 inches. This support structure has an upper surface over which the bottom surface of the personal watercraft or vehicle conveyor rides as the personal vehicle is moved to and from the platform. The support structure tubular members each have an upper surface to form a pair of spaced apart runways. Preferably, each of these runways is from about 2 to about 4 inches wide and about 60 to about 80 inches in length, having a surface area which is less than about 320 square inches. In accordance with this invention, these support structure runways each comprise an anti-friction material having a kinetic friction coefficient no greater than about 0.5. The preferred material used for the upper surfaces of both the ramp and support structure is a polymeric material such as, for example, a fluorocarbon polymer or a high density polyethylene.

The fourth feature is that the ramp is telescopically attached to the support structure, so that substantially the entire ramp is received in the support structure when the ramp is in the retracted position. Preferably, there is a locking mechanism that locks the ramp in the retracted position. In the preferred embodiment, the support structure includes a pair of spaced apart tubular members, preferably rectangular in configuration, disposed lengthwise on the platform having a predetermined length and the ramp includes a pair of spaced apart tubular members, preferably rectangular in configuration. One ramp tubular member is received in one support structure tubular member and the other ramp tubular member is received in the other support structure tubular member. The support structure preferably includes a roller member that facilitates movement of the ramp between the retracted and extended positions.

The fifth feature is that, in the case of personal watercraft, the support structure tubular members are oriented in a special manner. The bottom surface of the watercraft has a predetermined angular orientation. In accordance with this invention, each of the spaced apart runways of the support structure is oriented at substantially the same angular orientation as the portion of the bottom surface of the personal watercraft which each runway engages during loading and unloading.

The sixth feature is a winch mechanism mounted to the platform, or preferably, to the support structure. The winch mechanism includes a cable member such as, for example, a rope, strap, or wire, that is attached to the personal watercraft or the vehicle conveyor to enable the winch mechanism to load and unload the personal watercraft on and off the platform. Preferably, the ramp, support structure, and winch mechanism are assembled as a unit, enabling this assembly to be detached for storing. The winch mechanism may, however, be attached directly to the platform instead of being attached to the support structure. A hanger member is provided for hanging the unit on a wall and the like.

This invention also includes a method of loading and unloading a personal vehicle on and off a platform. This method includes:

(a) providing the platform with a ramp which is manually moveable between a retracted position where substantially the entire ramp is on the platform and an extended position where substantially the entire ramp extends from the platform, said ramp including an upper surface comprising an anti-friction material having a kinetic friction coefficient no greater than 0.5, and (b) when loading, moving the ramp from the retracted position to the extended position and pulling the personal vehicle into the platform over said upper surface, and (c) when unloading, moving the ramp from the retracted position to the extended position and moving the personal vehicle from the platform over said upper surface.

It is sometimes advantageous to use an intermediate conveyor during loading or unloading, or both. Two types of intermediate conveyors may be used: a sled-type and and dolly-type. With land vehicles such as, for example motor cycles, the sled-type conveyor is used. The motor cycle is first placed on the sled-type conveyor which has a bottom surface. The sled-type conveyor is directly attached to the winch which pulls the conveyor with the vehicle on it onto the platform,. The bottom surface of the sled-type conveyor rides over the upper surface of the ramp. The conveyor's bottom surface may also comprise an anti-friction material having a kinetic friction coefficient no greater than 0.5. Sometimes it is desirable to store the vehicle on the dolly-type conveyor and load and unload from and to this dolly-type conveyor. The dolly-type conveyor is elevated so that the vehicle is to about the same height as the platform. During loading or unloading, instead of first extending the ramp, the dolly-type conveyor is simply moved next to the platform and the vehicle is then moved directly from the conveyor onto the platform, or vice versa, without extending the ramp. In accordance with this invention, the ramp has a cross bar at an outer end thereof which is displaced to allow the bottom surface of the personal watercraft to clear the cross bar during loading and unloading when the ramp is in the retracted position.

DESCRIPTION OF THE DRAWING

The preferred embodiment of this invention, illustrating all its features, will now be discussed in detail. This embodiment depicts the novel and non-obvious personal vehicle transport apparatus and method of this invention as shown in the accompanying drawing, which is for illustrative purposes only. This drawing includes the following figures (FIGS.), with like numerals indicating like parts:

FIG. 2 is a perspective view of the vehicle loading and unloading apparatus of this invention similar to that shown in FIG. 1 with the ramp of the apparatus in an extended position.

FIG. 3 is a cross-sectional view taken along line 3—3 of FIG. 1 with the lower hull of a personal watercraft shown in phantom lines.

FIG. 3A is a fragmentary, cross-sectional view taken along line FIG. 3A—3A of FIG. 3.

FIG. 3B is a view similar to that of FIG. 3A showing the ramp in a fully extended position with the catch engaging roller members within the support structure for the ramp.

FIG. 3C is a view similar to FIG. 3B, except the ramp is lowered in an angular relation to the truck bed for movement of the watercraft onto or from the truck bed.

FIG. 10 is an end-sectional view taken along line 10—10 of FIG. 1, with the lower hull of a personal watercraft shown in phantom lines.

FIG. 11 is a side elevational view of the apparatus of this invention showing a sled-type conveyor attached to the winch.

DETAILED DESCRIPTION OF THE PREFERRED EMBODIMENTS

Figure 1:
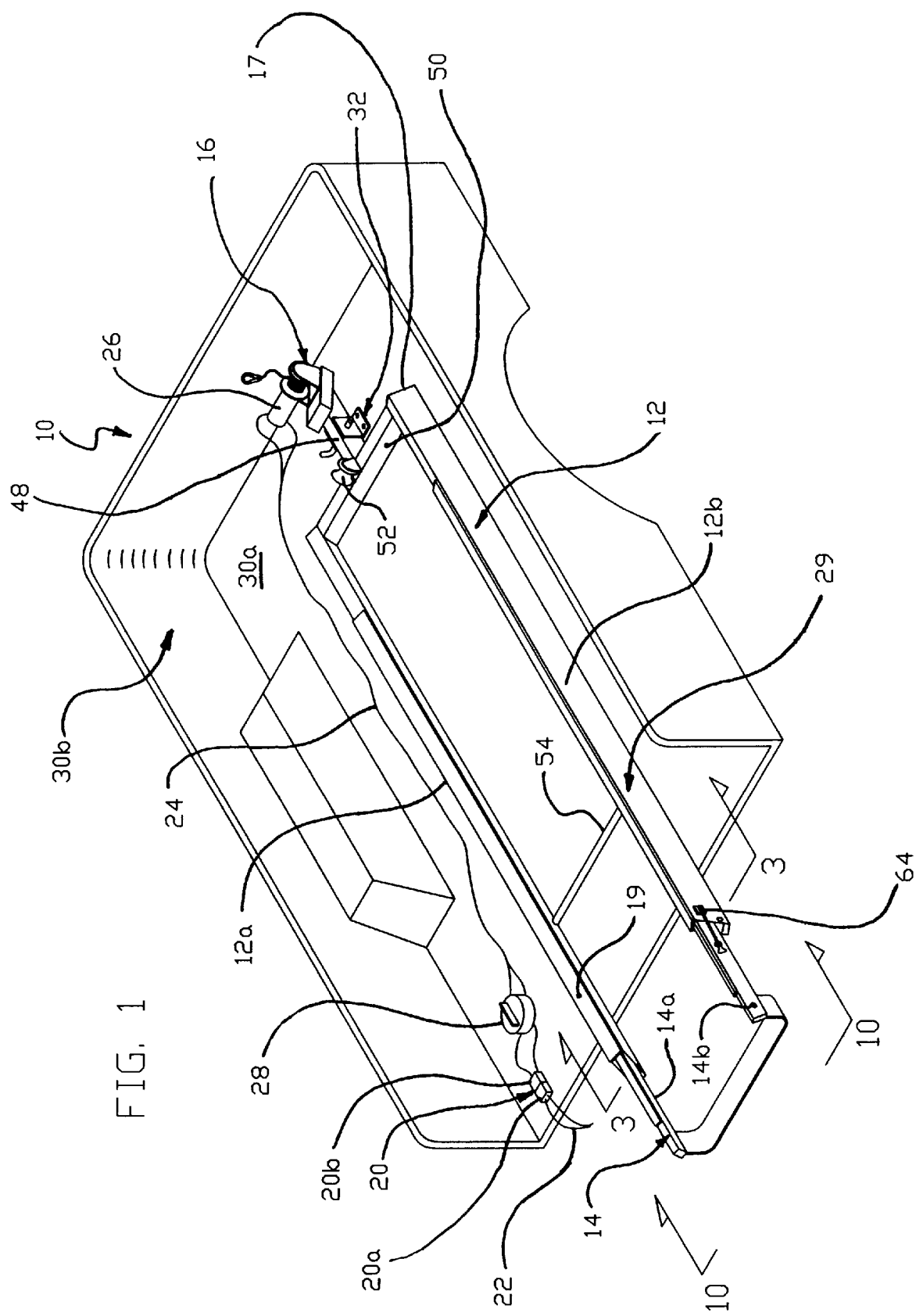
FIG. 1 is a perspective view of a truck bed having the vehicle loading and unloading apparatus of this invention detachably mounted to the floor of the truck bed with the ramp of the apparatus in a retracted position.
Figure 4:
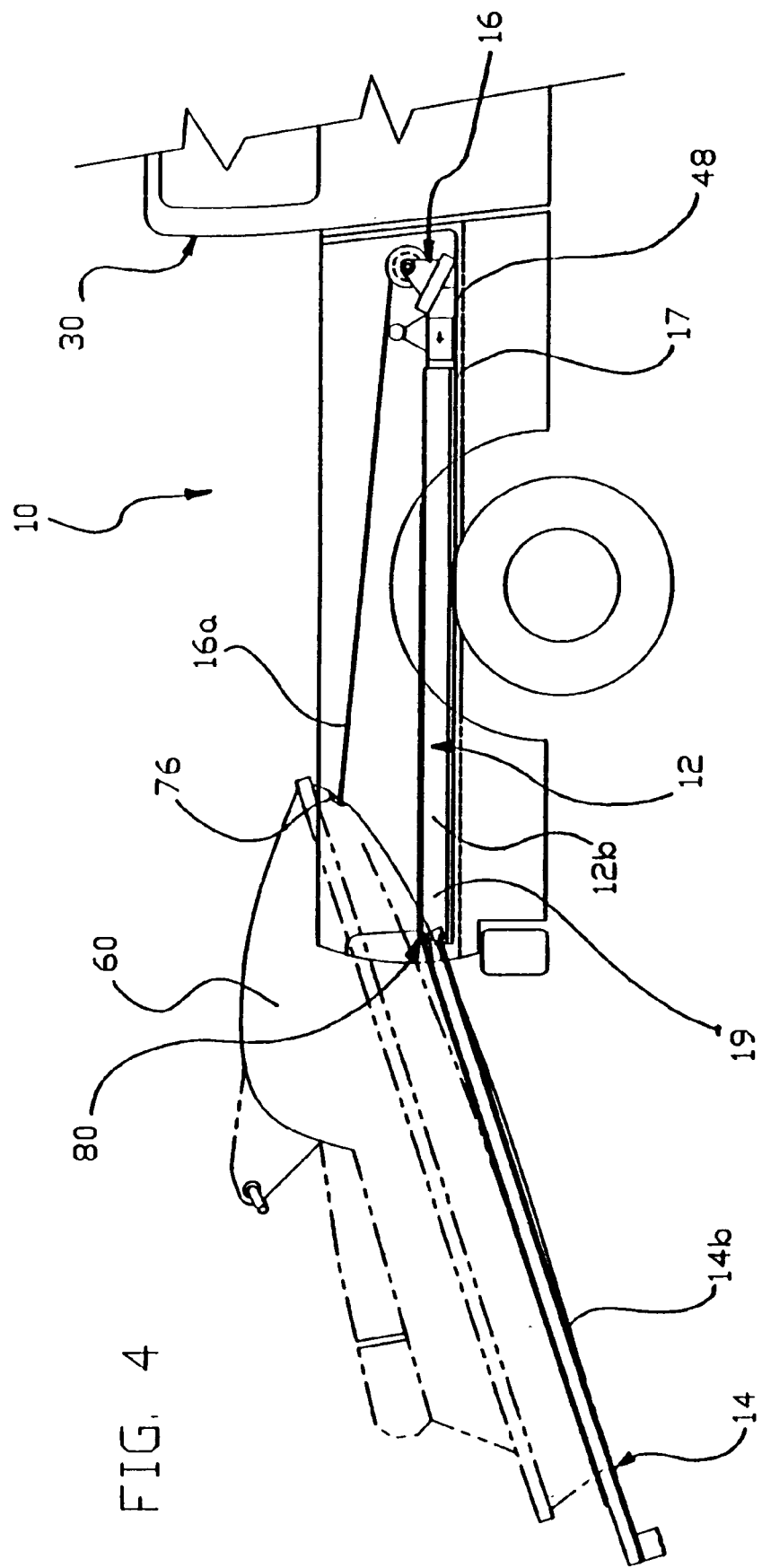
FIG. 4 is a side-elevational view showing a personal watercraft being pulled along the extended ramp into the truck bed.
Figure 5:
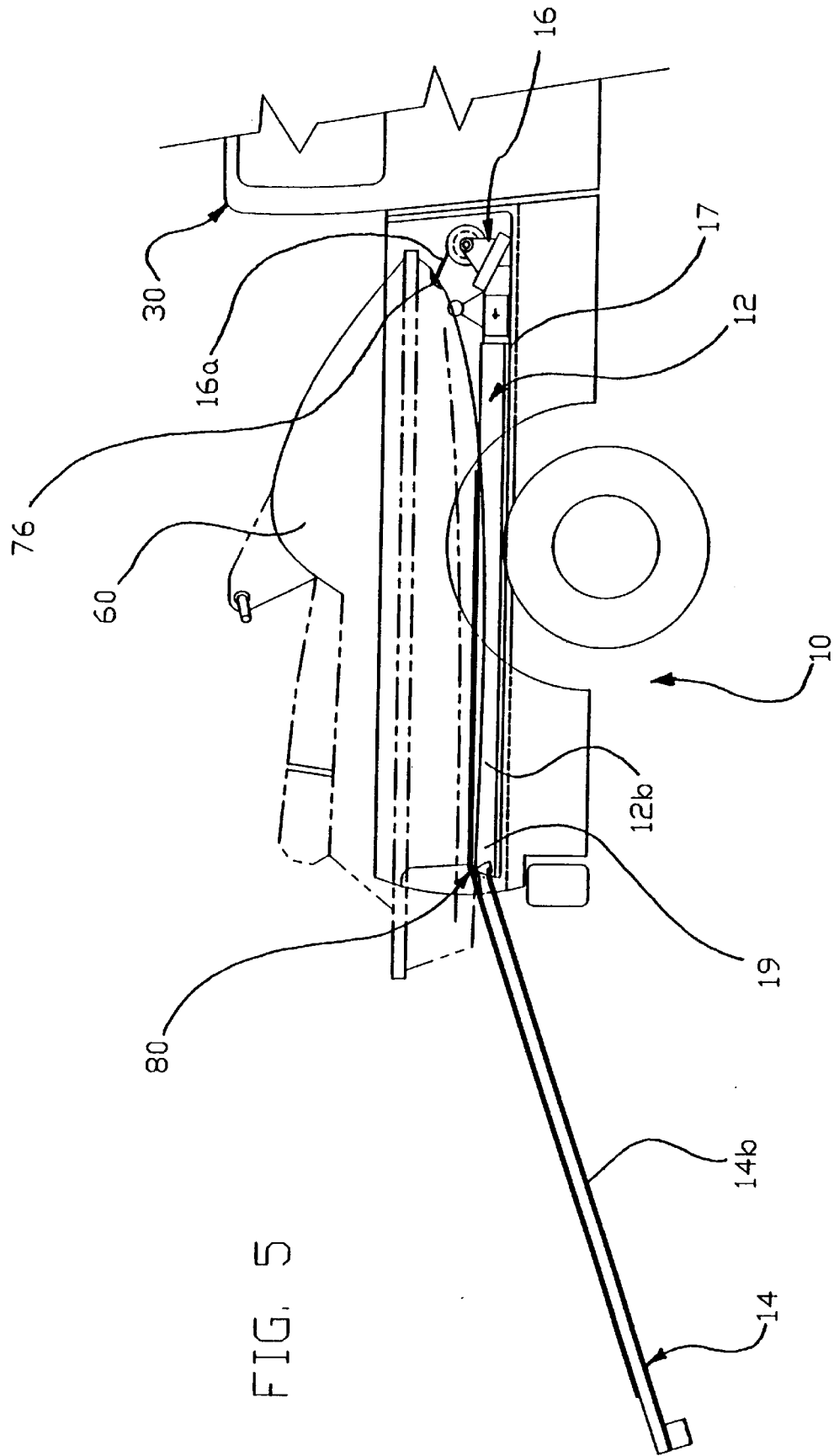
FIG. 5 is a side-elevational view similar to FIG. 4 showing the water craft loaded onto the truck bed, with the ramp in the extended position.
Figure 6:
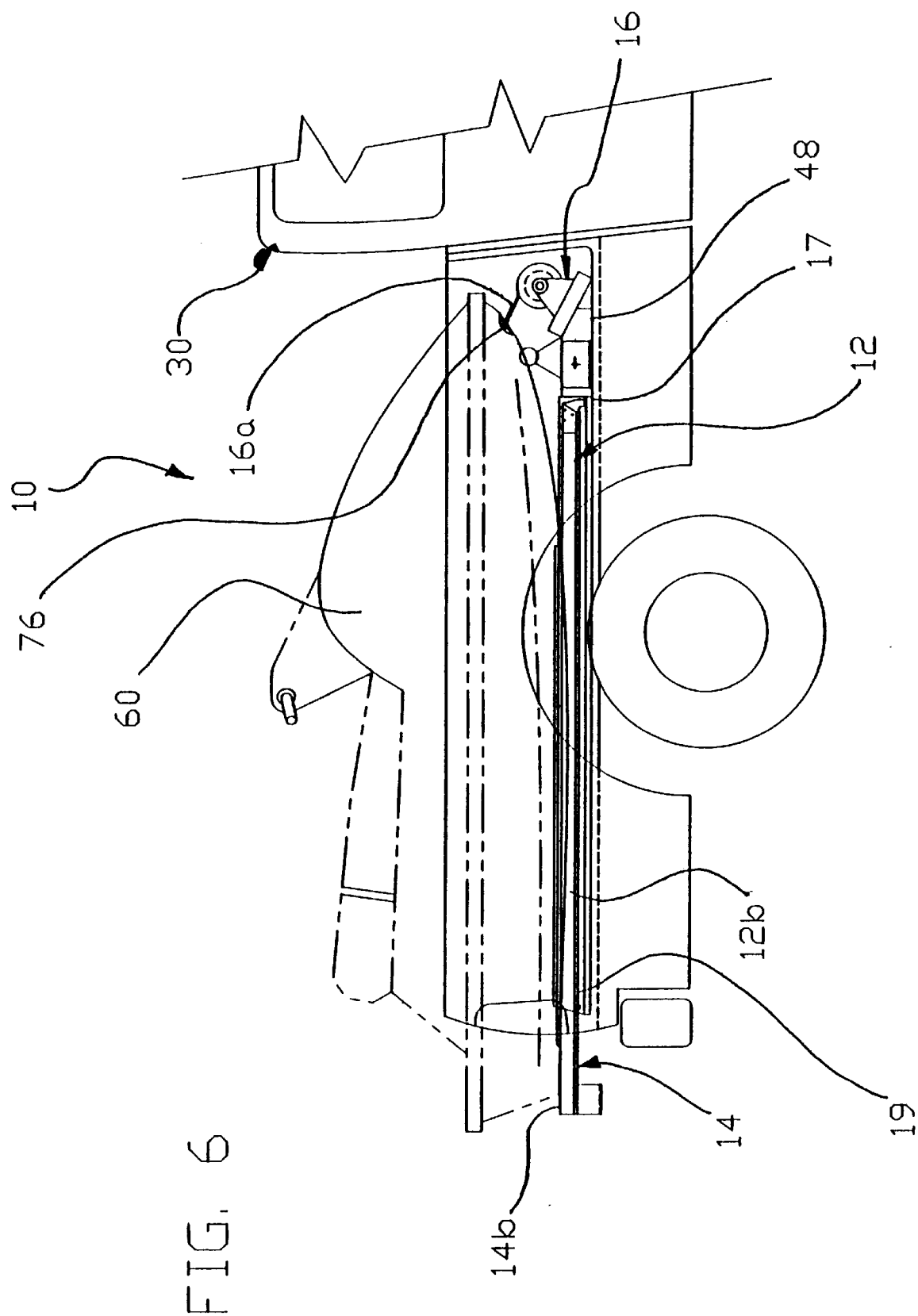
FIG. 6 is a side-elevational view similar to FIG. 5 showing the ramp in the retracted position.

As best illustrated in FIGS. 1 and 2, the vehicle loading and unloading apparatus 10 of this invention is a detachable unit 29 removably mounted to the floor 30a of a truck bed 30b. The unit 29 includes a support structure 12, a ramp 14 telescopically received within the support structure, and a winch 16 attached to the interior end 17 of the support structure. The ramp 14 slides in and out of the exterior end 19 of the support structure 12. FIG. 1 shows the ramp 14 in the retracted position, and FIG. 2 shows the ramp in the extended position. The winch 16 includes a cable 16a which rides over the bow stop 52, as illustrated in FIGS. 4 through 6, when a personal watercraft 60 is being loaded (or unloaded). This winch 16 may be a manually operated winch, or preferably, as shown, is an electrically powered winch such as one manufactured by Warn Industries, Inc. of Milwaukie, Oreg. A connector 20 is coupled to electric leads 22 which are attached to the battery (not shown) of the truck 30. Electrical 24 leads are connected to the motor 26 of the winch 16 through a circuit including a switch 28 which is attached to the connector 20. The connector 20 includes a male element 20a and female element 20b which may be disconnected when the apparatus is to be detached and removed from the bed 30a of a truck 30.

Figure 7:
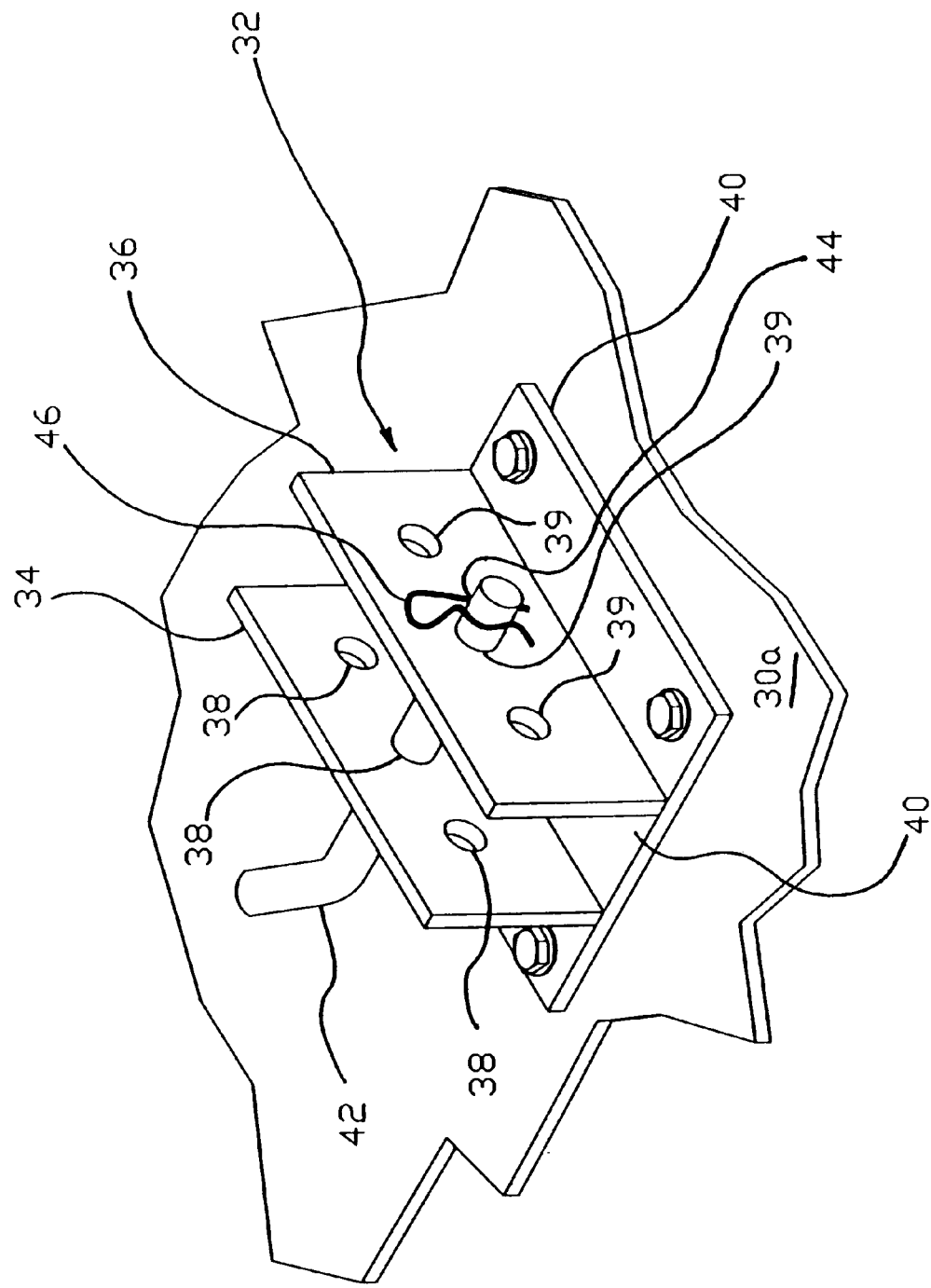
FIG. 7 is a perspective, fragmentary view showing the attachment unit for removably connecting the apparatus of this invention to the truck bed.

An attachment mechanism 32 for removably attaching the unit 29 to the floor 30a of the truck bed 30b is illustrated in FIG. 7. It includes a pair of spaced apart vertical plates 34 and 36, each plate having a series of three holes 38 and 39, respectively, which are aligned with the holes in the opposed plate. A horizontal base plate 40 is welded or otherwise secured to the vertical plates 34 and 36 and bolted to the floor 30a of the truck bed 30b. A removable pin 42 with an orifice 44 at one end extends through the central aligned holes 38 and 39, and a spring clip 46 maintains the pin in position until manually removed. The support structure 12 has an outwardly extending bar 48 (FIGS. 1 and 2) with an opening (not shown) in it. As depicted in FIGS. 1 and 2, when attaching the unit 29, the bar 48 is inserted into the space between the vertical plates 34 and 36 with the opening in the bar aligned with the aligned holes 38 and 39 in the vertical plates. Then the pin 42 is slipped through, for example, the central hole 38, then through the opening in the bar, and then into the central hole 39. The spring clip 46 is next placed in the orifice 44. To detach the unit 29, the spring clip 46 is removed and the pin withdrawn to enable the bar 48 to be slipped from between the vertical plates 34 and 36. Because the pin 42 may be inserted between any pair of aligned holes 38 and 39, the bar 48 may be placed in different locations relative to the plates 34 and 36, thereby accommodating watercrafts of varying lengths.

Figure 8:
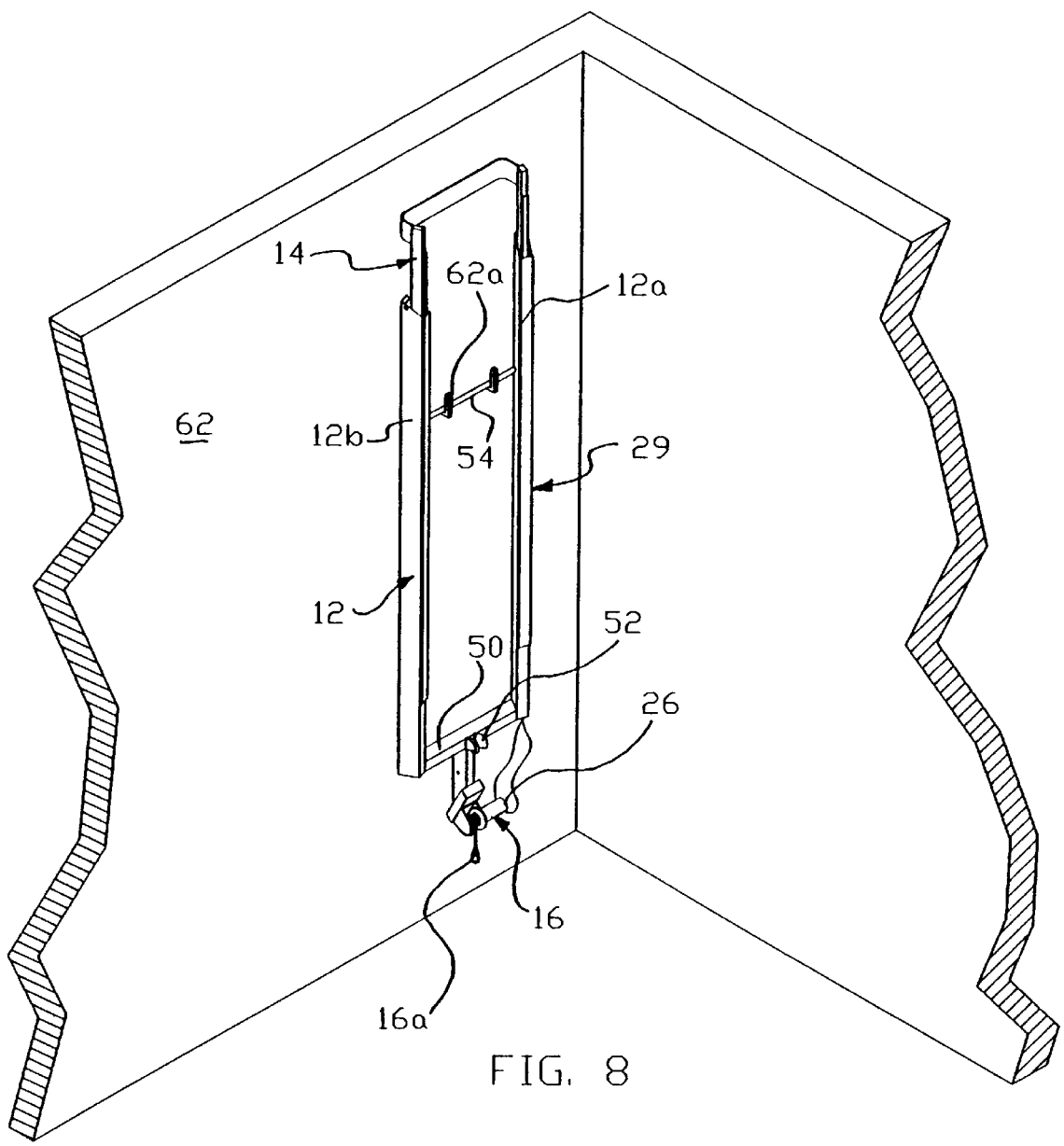
FIG. 8 is a perspective view showing the apparatus of this invention detached from the truck bed and hanging on a wall.

The support structure 12 has a generally U-shape and comprises a pair of rectangularly shaped tubular members 12a and 12b, preferably made of aluminium, which extend lengthwise parallel to the longitudinal axis X of the truck bed floor 30a, and are connected at the interior end 17 by a tube structure 50 having a bow stop 52 mounted to its upper surface. The height of each tubular member 12a and 12b is preferably about 4 inches, and should not exceed 6 inches. The support structure 12 may extend slightly beyond the truck bed 30a about 1 foot more or less. There is a cross bar 54 near the exterior end 19 which connects intermediate portions of the tubular members 12a and 12b. As depicted in FIG. 3, the top surfaces 12c of the tubular members 12a and 12b provide runways over which the bottom surface 60a of the personal watercraft 60 slides during loading and unloading, and they are tilted inward and oriented angularly to match the angularity of the bottom surface 60a of the personal watercraft 60. As shown in FIG. 8, when the unit 29 is detached from the truck bed floor 30a, this cross bar 54 is used as a hanger for hanging the apparatus on hooks 62a carried by a wall 62. Near the exterior end 19, each of the tubular members 12a and 12b have a locking mechanism 64 for retaining the ramp 14 in the retracted position until the locking mechanism is manually opened to enable the ramp to be moved into the extended position. As best illustrated in FIG. 3, the tubular members 12a and 12b each include one or more rollers 66 which facilitate moving the ramp 14 between extended and retracted positions.

Figure 9A:
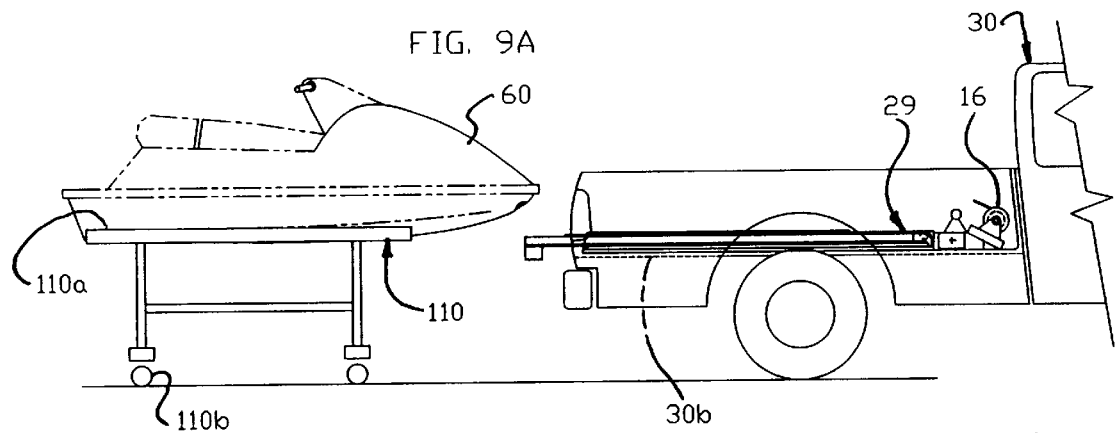
FIG. 9A is a side elevational view of the apparatus of this invention shown in FIG. 1 with the ramp retracted and a dolly conveyor holding a watercraft above ground level at about the height of the truck bed.
Figure 9B:
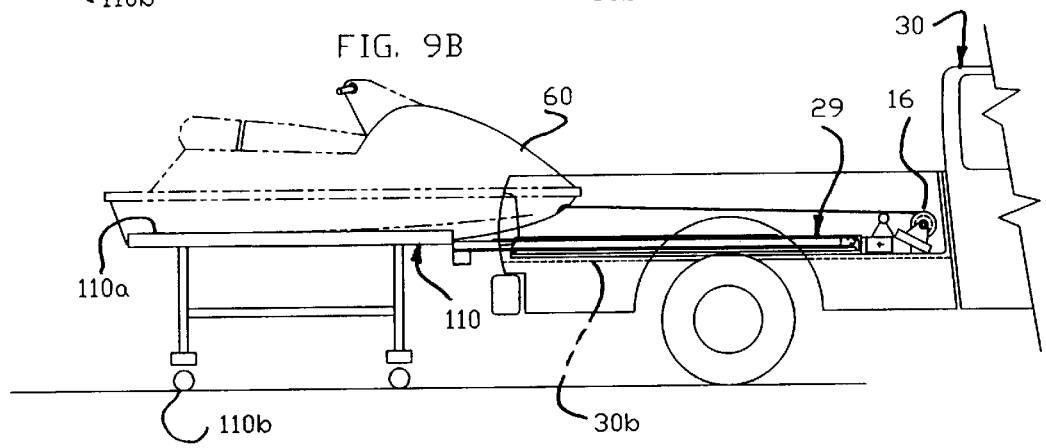
FIG. 9B is a side elevational view of the apparatus of this invention similar to that shown in FIG. 9A, with the dolly conveyor moved next to the open end of the truck bed and the watercraft being winched onto the truck bed.
Figure 9C:
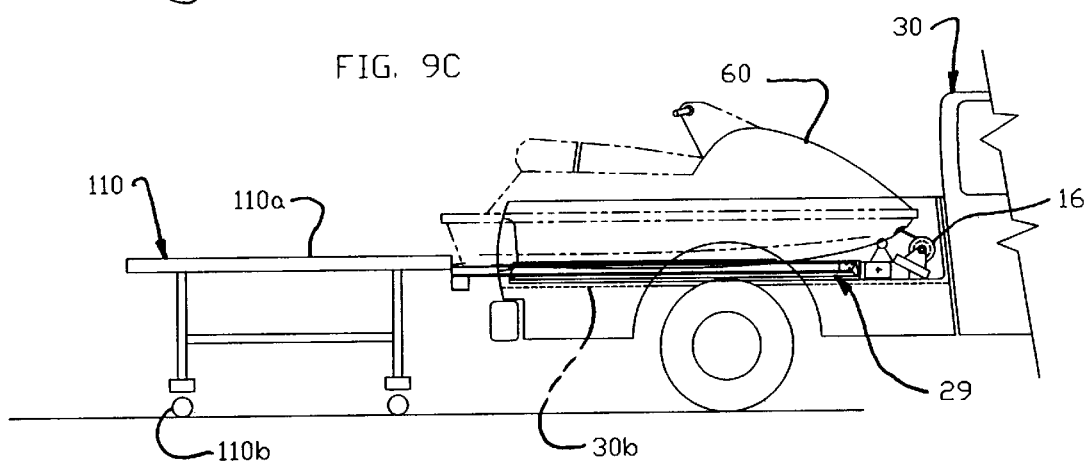
FIG. 9C is a side elevational view of the apparatus of this invention similar to that shown in FIG. 9B showing the watercraft moved from the dolly conveyor onto the truck bed.
Figure 12A:
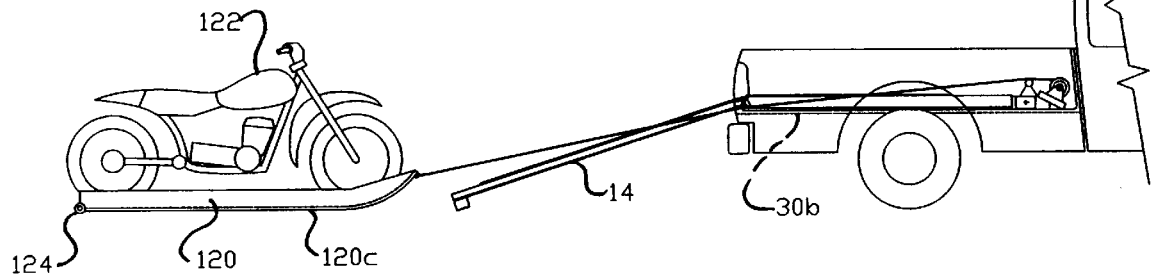
FIG. 12A is side elevational view of the apparatus of this invention with a motor cycle placed on the sled-type conveyor for loading onto the truck bed.
Figure 12B:
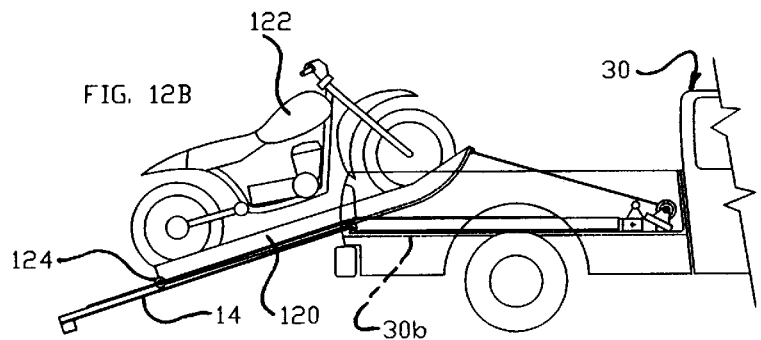
FIG. 12B is side elevational view of the apparatus of this invention similar to that shown in FIG. 12A, with the assembly of motor cycle and sled-type conveyor being pulled up the extended ramp.
Figure 12C:
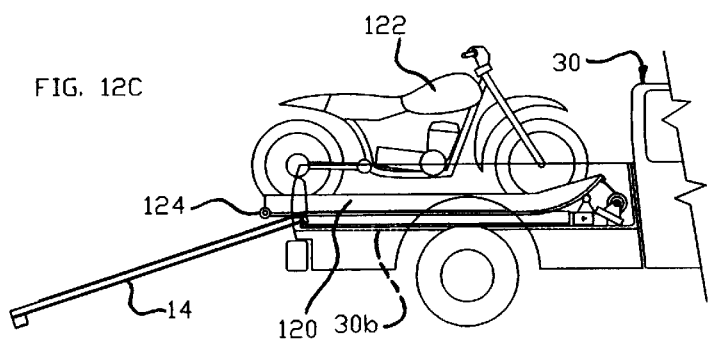
FIG. 12C is side elevational view of the apparatus of this invention similar to that shown in FIG. 12B, with the assembly of motor cycle and sled-type conveyor loaded onto the truck bed.

The ramp 14, as best shown in FIG. 2, has a generally U-shaped configuration with a pair of rectangularly shaped tubular members 14a and 14b, preferably made of aluminium, connected at their outer ends by a cross bar 70 which the user grasps when pulling the ramp 14 outward from the support structure 12. As shown in FIG. 10, because of the U-shape of the cross bar 70, the cross bar is displaced from the plane of the ramp 14 towards the ground to allow the bottom surface 60a of the personal watercraft 60 to clear the cross bar 70 during loading and unloading when the ramp is in the retracted position such as shown in FIGS. 9A through 9C.

As depicted in FIG. 3, each of the tubular members 14a and 14b has a height about equal to the distance between the roller member 66 and inside of the upper wall of each of the tubular members 12a and 12b. The upper surfaces 14d of the tubular members 14a and 14b are just beneath the upper walls 12e of the tubular members 12a and 12b and the flat bottoms 14e of the tubular members 14a and 14b ride on the rollers 66. As shown in FIGS. 3A through 3C, the interior ends 14d of the tubular members 14a and 14b, each include L-shaped catches 72 which engage the rollers 66 when the ramp 14 is in the fully extended position. The tubular members 14a and 14b are spaced apart and oriented angularly inward toward each other in the same manner as the tubular members 12a and 12b of the support structure 12, so that they fit within the hollow interiors of the tubular members 12a and 12b, sliding easily in and out as needed.

In accordance with this invention, the upper exterior surfaces 12c and 14d of the tubular members 12a and 12b and 14a and 14b, respectively, of both the support structure 12 and the ramp 14 are formed using a plate 100 of anti-friction material such as, for example, a fluorocarbon polymer (Teflon), or high density polyethylene. These plates 100 are riveted to the tubular members 12a and 12b and 14a and 14b. Each of these materials has a kinetic friction coefficient ranging from about 0.12 and about 0.20. These anti-friction surfaces 12c and 14d thus make it extremely easy for the personal watercraft 60 to slide along the ramp 14 and support structure 12 surfaces as it is moved onto and from the truck bed.

As best illustrated in FIGS. 4 through 6 and 8, to use the unit 29 of this invention, it is taken, for example, from its storage position hanging on a wall 62, as shown in FIG. 8, and mounted to the floor 30a of the truck bed 30b by positioning the bar 48 between the vertical plates 34 and 36 of the attachment mechanism 32 and sliding the pin 42 in the aligned holes 38 and 39, slipping the spring clip 46 into position, as shown in FIG. 7. One element 20b of the connector 20 is plugged into the other element 20a of the connector. To load and unload the personal watercraft 60, the ramp 14 is then manually pulled from the support structure 12 by grasping the cross bar 70 and pulling the ramp 14 outward until the catches 72 engage the rollers 66. With the ramp 14 in the extended position, the tubular member 12a is aligned with the tubular member 14a and the tubular member 12b is aligned with the tubular member 14b, and there is only a slight gap 80 between adjoining tubular members. The cable 16a is attached to a conventional bow eye 76 of the watercraft 60, and the switch 28 is turned on, providing power to the winch motor 26 to either pull the watercraft 60 up the ramp 14 and onto the support structure 12 or assist in lowering it off the truck bed 30b. As the bottom surface 60a of the watercraft 60 rides smoothly over the low friction surfaces 12c and 14d, it is not damaged. Since the gap 80 is so small, being less than 0.50 inch in width, it does not interfere with the transition from the ramp 14 to the support structure 12, or vice versa. Because the height of the support structure 12 is less than 12 inches, the center of gravity of the combined watercraft 60 and truck 30 is maintained as close to the ground as possible. When the watercraft 60 is completely loaded onto the truck bed, as shown in FIG. 6, the ramp 14 is manually pushed into the support structure 12 with the ramp tubular members 14a and 14b sliding into the support structure tubular members 12a and 12b. During unloading, the process is reversed, with the ramp 14 being extended and the winch 16 operated in the reverse direction while the user guides the water craft off the truck bed and onto the ramp 14, and then into the water. To detach the apparatus from the truck bed 30a, the elements 20a and 20b of the connector 20 are disconnected from each other, the pin 42 is removed from the attachment mechanism 32, and the assembly of the winch 16, support structure 12, and ramp 14, with the ramp in the retracted position, is removed from the truck bed 30a and hung on the wall 62, using the cross bar 54 as a hanger.

As shown in FIGS. 9A through 9C, a dolly-type conveyor 110, typically stored in a garage where the unit 29 and truck 30 are stored, may be used to load or unload the watercraft 60 from the bed 30b of the truck. The top 110a of this conveyor 110 is about equal to the height of the truck bed 30b. The watercraft 60 is positioned on the top 110a of the dolly-type conveyor 110, which has wheels 110b that enable the dolly-type conveyor to be manually pushed to a position next to the open end of the truck bed 30b. As shown in FIG. 9B, the dolly-type conveyor 110 is moved into a position where the forward end of the watercraft 60 is just over the open end of the truck bed 30b, allowing the watercraft to be winched from the dolly-type conveyor onto the truck bed without extending the ramp 14. At the location where the watercraft 60 is to be unloaded, the ramp 14 is extended as discussed above and the watercraft is moved over the ramp into the water. After again loading the watercraft 60 onto the truck bed 30b and returning to the garage, the watercraft 60 may again be moved from the truck bed 30b onto the dolly-type conveyor 110 without extending the ramp 14. Because of the U-shape of the crosss bar 70 (FIG. 10), the bottom surface 60a of the watercraft 60 does not scrape against this crosss bar 70 with the ramp 14 in the retracted position during the loading and unloading directly from and to the dolly-type conveyor 110.

As shown in FIGS. 11 and 12A through 12C, a sled-type conveyor 120 may be used to load and unload a land vehicle such as, for example, a motor cycle 122, on and off the truck 30. The rear end of the sled-type conveyor 120 may include wheels 124 to aid in moving the sled-type conveyor across a surface. Preferably, the bottom 120c of the sled-type conveyor 120 is an anti-friction surface. The cable 16a of the winch 16 is attached to the forward end of the sled-type conveyor 120, and, with the ramp 14 in the extended position, the assembly of sled-type conveyor 120 and motor cycle 122, is winched onto the truck bed 30b. The ramp 14 is then moved to the retracted position. In unloading, the assembly of sled-type conveyor 120 and motor cycle 122 is lowered from the truck bed 30b, with the bottom of the sled-type conveyor sliding over the anti-friction surface of the ramp.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

I claim:

1. A unit adapted to be mounted to a platform and used to load and unload a personal vehicle on and off the platform, including a support structure adapted to support a personal vehicle thereon, said support structure comprising
  (i) a pair of substantially parallel runways with top surfaces made of an anti-friction material having a kinetic friction coefficient no greater than 0.5, said runways being formed of aluminum tubular members having a rectangular cross-section, each tubular member having a pair of opposed ends and each tubular member having a height which does not exceed 6 inches,
  (ii) a connecting structure which connects together one end of each tubular member so that the support structure has a substantially U-shape, and
  (iii) an elongated mounting member extending outward from the connecting structure substantially at a right angle to the connecting structure for detachably mounting the support structure to the platform;

a moveable ramp comprising
  (i) a pair of substantially parallel, ramp members with top surfaces made of an anti-friction material having a kinetic friction coefficient no greater than 0.5, each ramp member being formed of aluminum tubular members having a rectangular cross-section and having a pair of opposed ends,
  (ii) a cross member which connects together one end of each ramp member so that the moveable ramp has a substantially U-shape, said cross member being substantially U-shaped and oriented to avoid contact with a bottom surface of a personal vehicle during loading and unloading, said ramp being connected to the support structure so that each ramp member is telescopically received in one of the tubular members of the support structure so that the ramp is manually moveable between a retracted position and an extended position; and a winch mechanism attached to the support structure for pulling the personal watercraft onto the platform, when the unit is attached to the platform.

2. The unit of claim 1 where each of the spaced apart runways of the support structure is oriented at substantially the same angular orientation as a portion of the bottom surface of a personal watercraft which each runway engages during loading and unloading.

3. The unit of claim 1 where the winch is powered by an electric motor connected through a circuit including a switch attached to a connector which may be disconnected when the unit is to be detached from the platform.

4. The unit of claim 1 including an attachment mechanism adapted to be connected to the platform and having a pair of spaced apart vertical plates between which the mounting member is placed and connected to upon connecting the unit to the platform.

5. The unit of claim 4 where there are a plurality of different positions for connecting the mounting member to the attachment mechanism so that the relative position of the unit on the platform may be varied.

6. The unit of claim 1 including a bow stop on the connecting structure.

7. The unit of claim 1 including a hanger bar extending between the tubular members of the support structure.

8. A personal vehicle loading and unloading apparatus, including
    a platform adapted to support a personal vehicle,
    said platform having a unit detachably mounted thereon, including
      (i) a support structure which telescopically receives a moveable ramp which is manually moveable between a retracted position where substantially the entire ramp is on the platform and an extended position where substantially the entire ramp extends from the platform,
      (ii) said support structure including an elongated mounting member and an attachment mechanism connected to the platform and having a pair of spaced apart vertical plates between which the mounting member is placed and connected to upon connecting the unit to the platform and said support structure and ramp each including an upper surface comprising an anti-friction material having a kinetic friction coefficient no greater than 0.5, and
      (iii) a winch mechanism attached to the support structure and mounted to pull the personal vehicle onto the platform, said winch mechanism being driven by an electric motor in a circuit including a switch attached to a connector which is connected during loading and disconnected when the unit is to be detached from the platform.

9. The personal vehicle loading and unloading apparatus of claim 8 where the unit includes a hanger member for hanging the unit on a wall.

10. The personal vehicle loading and unloading apparatus of claim 8 where there are a plurality of different positions for connecting the mounting member to the attachment mechanism so that the relative position of the unit on the platform may be varied to accommodate personal vehicles of varying lengths.

11. The personal vehicle loading and unloading apparatus of claim 8 where there is a locking mechanism that locks the ramp in the retracted position.

12. The personal vehicle loading and unloading apparatus of claim 8 where the support structure has a height of less than 12 inches.

13. The personal vehicle loading and unloading apparatus of claim 8 where the support structure includes a roller member that facilitates movement of the ramp between the retracted and extended positions.

14. The personal vehicle loading and unloading apparatus of claim 8 particularly adapted for use with a personal watercraft where the bottom surface of the personal watercraft has a predetermined angular orientation and the support structure upper surface comprises a pair of spaced apart runways each having a surface area which is less than 320 square inches and each oriented in substantially the same angular orientation as the bottom surface of the personal watercraft which each runway engages during loading and unloading.

15. The personal vehicle loading and unloading apparatus of claim 8 where the ramp has a cross bar at an outer end thereof which is displaced to allow the bottom surface of the personal watercraft to clear the cross bar during loading and unloading when the ramp is in the retracted position.

16. A method of loading a personal vehicle on a platform, including
    (a) detachably mounting to the platform a unit, including
      (i) a support structure having a height which does not exceed 6 inches when attached to the platform and which telescopically receives a moveable ramp which is manually moveable between a retracted position where substantially the entire ramp is on the platform and an extended position where substantially the entire ramp extends from the platform, said support structure and ramp each having a substantially U-shape,
      (ii) said support surface and ramp each including an upper surface comprising an anti-friction material having a kinetic friction coefficient no greater than 0.5,
      (iii) a winch mechanism attached to the support structure and mounted to pull the personal vehicle into the platform, said winch mechanism being driven by an electric motor in a circuit including a switch attached to a connector adapted to be connected and disconnected to an electrical power source, and
      (iv) an elongated mounting member extending outward from the connecting structure substantially at a right angle to the connecting structure for detachably mounting the support structure to the platform,
    (b) extending the ramp, positioning the personal vehicle next to the ramp, and connecting the winch mechanism to the personal vehicle,
    (c) connecting the connector to the electrical power source, and
    (d) closing the switch to energize the motor causing the winch mechanism to pull the personal vehicle up the ramp onto the support structure.

17. The method of claim 16 where the personal vehicle is unloaded and then the connector elements are disconnected.

18. The method of claim 17 where the unit is detached from the platform after unloading the personal vehicle and hung on a wall for storage.

19. The method of claim 16 where the personal vehicle is a watercraft with the bottom of the watercraft sliding over the upper surfaces during loading.

20. The method of claim 16 where the personal vehicle is first placed on an intermediate conveyor which has a bottom surface, said intermediate conveyor being attached to the winch which pulls the vehicle on the conveyor onto the platform with the bottom surface of the conveyor riding over the upper surface of the extended ramp.

21. A unit adapted to be mounted to a platform and used to load and unload a personal vehicle on and off the platform, including
    a support structure adapted to support a personal vehicle thereon, said support structure comprising
      (i) a pair of substantially parallel runways with top surfaces made of an anti-friction material, said runways being formed of tubular members, each tubular member having a pair of opposed ends and each tubular member having a height which does not exceed 6 inches,
      (ii) a connecting structure which connects together one end of each tubular member so that the support structure has a substantially U-shape, and (iii) an elongated mounting member extending outward from the connecting structure substantially at a right angle to the connecting structure for detachably mounting the support structure to the platform;

a moveable ramp comprising
  (i) a pair of substantially parallel, ramp members with top surfaces made of an anti-friction material, each ramp member being formed of tubular members having a pair of opposed ends,
  (ii) a cross member which connects together one end of each ramp member so that the moveable ramp has a substantially U-shape, said cross member being substantially U-shaped and oriented to avoid contact with a bottom surface of a personal vehicle during loading and unloading, said ramp being connected to the support structure so that each ramp member is telescopically received in one of the tubular members of the support structure so that the ramp is manually moveable between a retracted position and an extended position; and a winch mechanism attached to the support structure for pulling the personal watercraft onto the platform, when the unit is attached to the platform.

* * * * *